Sept. 29, 1959  L. PERAS  2,906,377
SHOCK ABSORBER WITH VALVES IN PISTON SEAL
Filed Nov. 12, 1957  4 Sheets-Sheet 1
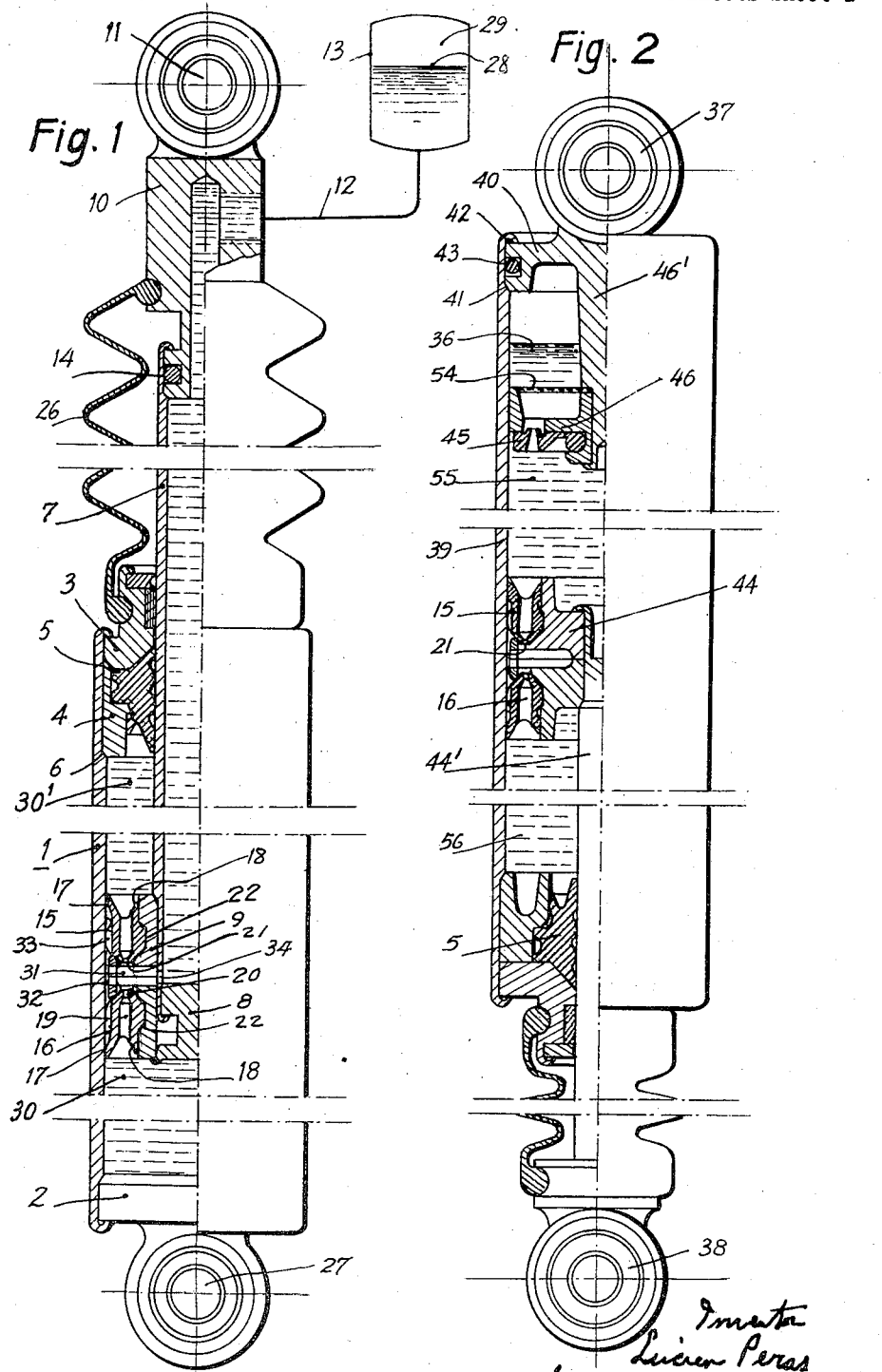

Sept. 29, 1959            L. PERAS            2,906,377

SHOCK ABSORBER WITH VALVES IN PISTON SEAL

Filed Nov. 12, 1957            4 Sheets-Sheet 2

Sept. 29, 1959 L. PERAS 2,906,377
SHOCK ABSORBER WITH VALVES IN PISTON SEAL
Filed Nov. 12, 1957 4 Sheets-Sheet 3

Inventor
Lucien Peras
by
Stevens, Davis, Miller & Mosher
Attorneys

Sept. 29, 1959    L. PERAS    2,906,377
SHOCK ABSORBER WITH VALVES IN PISTON SEAL
Filed Nov. 12, 1957    4 Sheets-Sheet 4
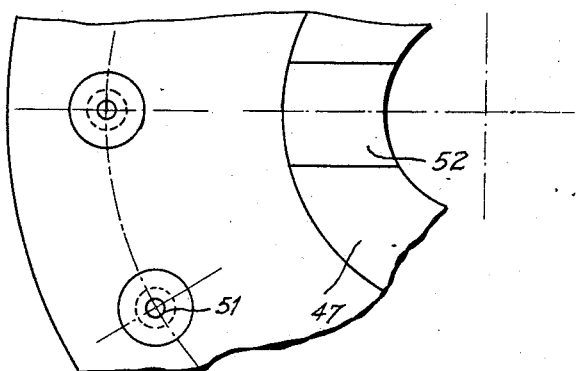
Fig. 7
Fig. 6
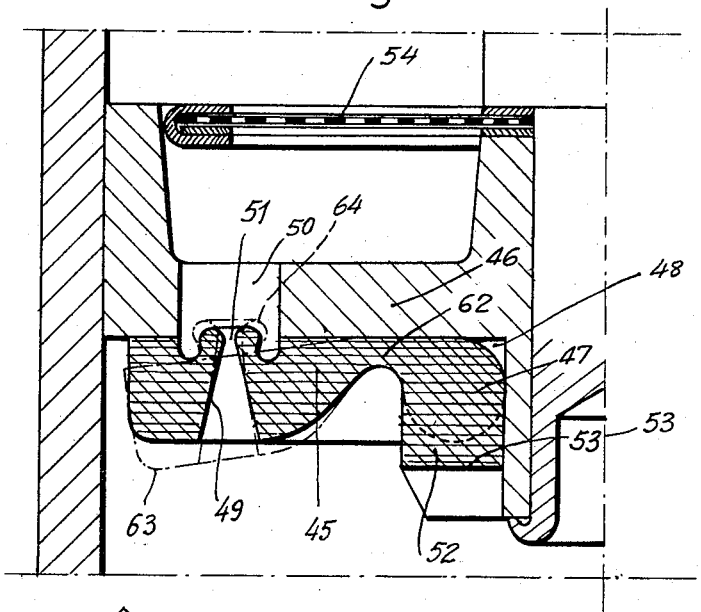
Fig. 8
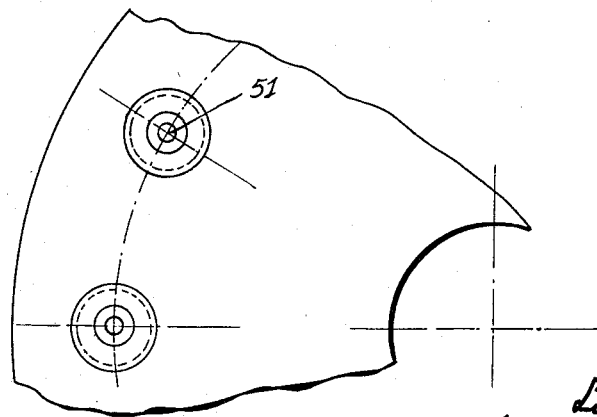
Inventor
Lucien Peras
by Stevens, Davis, Miller + Mosher
Attorneys United States Patent Office 2,906,377
Patented Sept. 29, 1959

2,906,377
SHOCK ABSORBER WITH VALVES IN PISTON SEAL

Lucien Peras, Billancourt, France, assignor to Regie Nationale des Usines Renault, Billancourt, France, a French works Application November 12, 1957, Serial No. 695,574

Claims priority, application France November 14, 1956

7 Claims. (Cl. 188—88)

The principle of operation of piston type hydraulic shock-absorbers is well known, and the forms of construction of shock absorbers for vehicles are numerous.

In order that it may be effective, a shock-absorber should correct the effects of small displacements of the wheels just as well as the larger displacements, that is to say it should damp the slight oscillations as well as the more powerful, taking account of the action of the suspension springs. Now, this object is not attained when the orifices for the passage of the fluid across the piston are fixed and unvarying. In this case, for example, the correct damping effect for small displacements of the wheels is excessive for the largest displacements, and the damping effect lacks flexibility. With this object, shock-absorbers have already been constructed, in the orifices of which are mounted devices which provide a controlled or progressive passage for the fluid.

In the apparatus forming the subject of the invention, the orifices proper are extensible, in such manner that during an abrupt and large displacement, the orifices of the piston open under the effect of the pressure so as to provide a greater section of passage for the oil from one side to the other of the cylinder. The shock resulting from passing over a bump or from an oscillation is considerably attenuated. The damping effect remains complete, but it is more flexible.

The extension of the orifices is obtained by virtue of the use of special tubes formed integrally with the packings of the piston, these tubes being made of plastic material, rubber or any other material having similar properties.

These tubes are pierced with orifices of pre-determined diameter which are capable by reason of their elasticity of becoming greater when the pressure of flow of the oil increases. These orifices immediately return to their initial diameter when the excess of pressure has disappeared.

The shock-absorber, in accordance with the invention has, in addition, the particular feature that it does not comprise any springs, valves, or mechanical device to regulate the passage of the fluid, since it is well known that these devices frequently deteriorate during use and thus reduce the margin of safety and the life of the equipments on which they are mounted.

The invention also comprises other special features which will more clearly appear in the description given below, which relates, by way of example only and not in any sense of limitation, to a straight-line shock-absorber, that is to say of the kind in which the piston is directly associated with the movement of the chassis or of the wheel.

In the accompanying drawings:

Fig. 1 is a view in longitudinal cross-section of a shock-absorber in accordance with the invention;

Fig. 2 is a view in longitudinal cross-section relating to an alternative form of construction;

Fig. 6 is a detailed view of the valve packing of the cylinder head shown in Fig. 2 and of its mounting.

Fig. 7 is a partial plan view of the packing shown in Fig. 6, seen from below;

Fig. 8 is a partial view in plan of the same packing seen from above;

Figure 3:
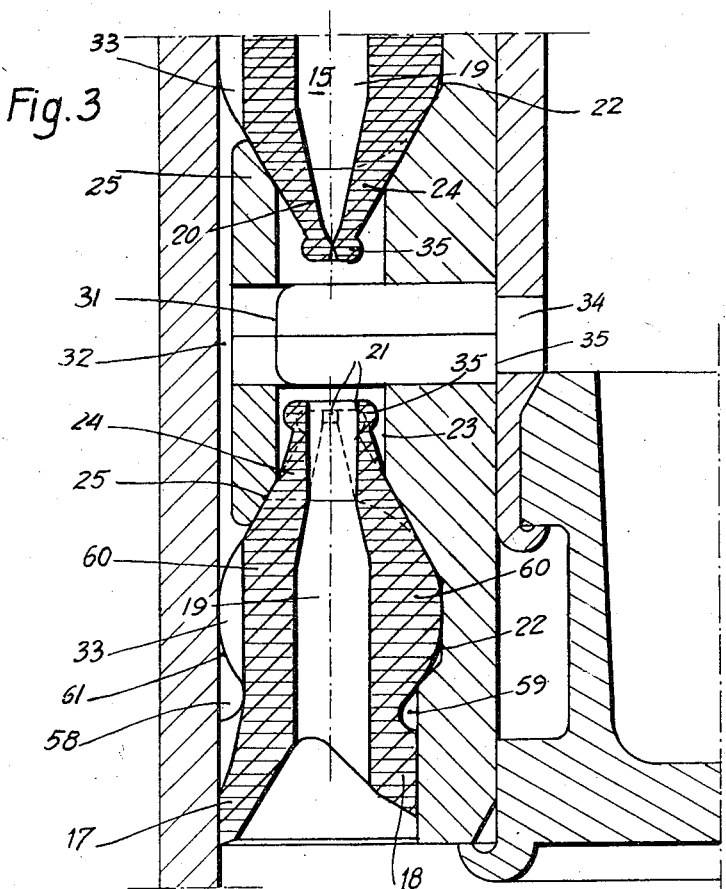
Fig. 3 is an enlarged radial cross-section of the piston of the shock-absorber shown in Fig. 1, and of the packings with which this shock-absorber is equipped, together with that of Fig. 2.

With reference to Fig. 1, there is shown the shock-absorber body of the cylinder 1 which is closed at one extremity by an inset base 2, and at the other extremity by a flange 3 which is also inset and which locks the ring 4 retaining the packing 5 of the stuffing gland against the internal shoulder 6 of the cylinder.

The hollow rod 7 of the piston is closed at one extremity by the plug 8 which is inset at the same time as the piston 9, and at its other extremity by a head 10 carrying the mounting ring 11. This head enables the internal chamber of the hollow rod 7 to be put into communication through the pipe 12 with a reservoir 13; this function of reservoir may be carried out by the rod and its head only. A ring joint 14 ensures the fluid-tightness of the head 10 in the rod 7. A similar joint could be placed on the plug 8 at the other end of the rod.

Figure 4:
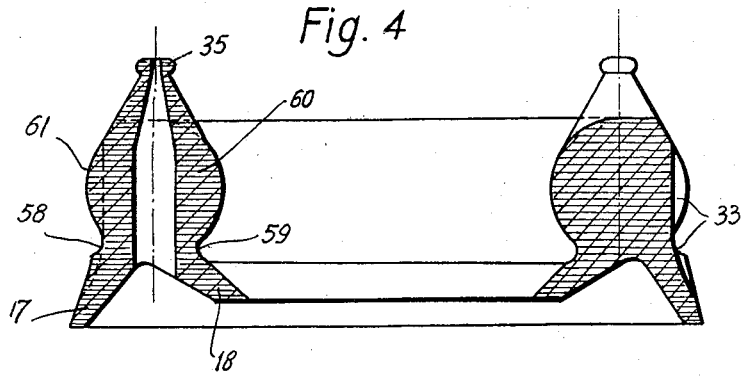
Fig. 4 is a view in transverse cross-section of a piston packing taken along the line IV—IV of Fig. 5.
Figure 5:
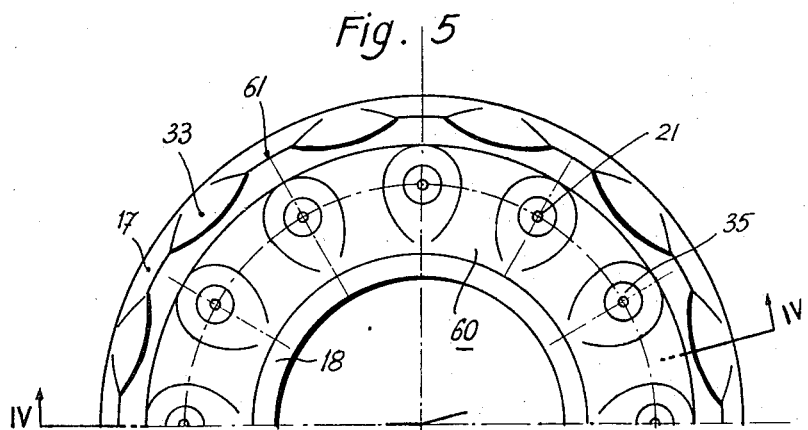
Fig. 5 is a plan view of the piston packing shown in Fig. 4.

The piston 9 is provided with two packings 15 and 16 which are symmetrically arranged and ensure the fluid-tightness of the piston in the cylinder by virtue of the lips 17, 18, the packings being shown to a larger scale in Figs. 3 to 5. They offer in addition a passage for the fluid through the orifices 19 and the tubes 20 which are pierced with a hole 21 of small cross-section. These packings are mounted in tension on the piston in circular grooves 22 of polygonal cross-section; the tubes 20, of which 12 are shown in Fig. 5, are engaged during assembly in the housings 23 of the piston (see Fig. 3), their conical extremities 24 fitting closely against the seatings 25 of the piston. A bellows member 26 protects the piston rod on the outside of the cylinder.

The operation of the shock-absorber is as follows:

The apparatus is fixed to the chassis by the ring 11 and to the train of wheels by the ring 27 and, when the vehicle is at rest, is substantially in the position shown in Fig. 1. The body of the device is full of oil, the level being established at 28 in the reservoir 13 under the pressure of air existing in the chamber 29.

As soon as the vehicle starts to move, the irregularities of the ground surface produce an alternating movement of the piston 9 inside the cylinder. When the vehicle passes over a small unevenness in the ground, the shock-absorber body coupled to the train of wheels rises, and the oil contained at 30 is compressed; it does not however prevent the relative movement of the piston, since the orifices 21 of the packing 16 provide a passage towards the upper chamber 30' through the conduits 31 formed in the piston, the annular space 32 between the body of the piston and the cylinder, the annular space 32 between the piston body and the cylinder, and then the slots 33 formed in the packing 15 opposite to the packing 16, the orifices 21 of which tend to close under the action of pressure.

However, the small section of the orifices 21 offers a considerable resistance to the flow of oil and thus retards the movement of the piston, thus damping the abrupt vertical movement of the wheels. It should be noted here that the volume of oil displaced from the chamber 30 cannot wholly be accepted by the chamber 30¹, the variation in volume of which is smaller by reason of the presence of the rod 7. The remainder of the oil then passes through the hole 34 into the hollow piston rod and to the reservoir 13.

When the bump has been passed over, the suspension springs apply a reverse action on the shock-absorber to that described above. The piston coupled to the chassis rises, the oil in the chamber 30¹ is compressed and passes into the chamber 30 through the orifices 21, the conduits 31, the annular passage 32 and the notches 33 in the packing 16. During the course of this movement, the oil which had previously been passed into the piston rod returns to complete the filling of the chamber 30 up to the moment when the shock-absorber has returned to its normal position.

If the inequalities of the ground were much greater, more abrupt, or encountered at a higher speed, and if the small section of the orifices 21 were invariable, the latter would not permit the passage of oil from the chamber 30 to the chamber 30¹ in a sufficiently short time, and the excessive resistance offered to the relative movement of the piston in the cylinder would create a shock which would be severely felt by the passengers.

It is at this point that the special property of the shock-absorber, in accordance with the invention, comes into play, which consists in permitting the enlargement of the opening of the orifices which brake the flow of fluid as a function of the pressure. It can be seen from Fig. 3 that the orifice 21 of the tubes 20 is reinforced by an annular portion 35. When the impulse received by the wheels is small, the pressure in the shock-absorber rises also to a small extent, and the orifice 21 can resist the expansion force which is applied to it; it does not increase in size. The speed of flow of the oil thus corresponds to the displacement of the wheels and the damping effect is very progressive.

On the other hand, if the wheels receive a very violent impulse, the high compression of the oil overcomes the elastic force of the ring portions surrounding the orifices 21 which open wider and thus allow a larger volume of oil to pass (this phase is shown in Fig. 3); the shock effect is prevented and the shock-absorber has really reduced the effect of the dangerous passage.

In an alternative form as shown in Fig. 2, the oil reservoir is constituted by the upper portion of the shock-absorber cylinder, the level of oil being shown in this figure at 36.

In this case, the cylinder is coupled to the chassis by means of the ring 37, the piston head 38 being fixed to the train of wheels. In the cylinder 39, the upper base 40 resting on the shoulder 41 is inset at 42 and provided with a fluid-tight ring joint 43.

A piston 44, provided with packings 15 and 16 identical to these provided for the shock-absorber shown in Fig. 1, moves inside the cylinder with its solid rod 44¹ which passes through a packing gland 5 of exactly the same shape as that of Fig. 1, but the diameter of the rod 44¹ can in this case be smaller than that of the rod 7.

The cylinder comprises at its upper portion a packing-valve 45, the seating 46 of which forms a partition and de-limits the oil reservoir, this seating being inset on a rod 46¹ provided in the base 40 of the cylinder. The valve is mounted and held applied against its seating by its toric portion 47 which engages in a circular groove 48 formed in the seating, as shown in Fig. 6.

Tubular members 49 are formed in the packing and engage in holes 50 formed in the seating. These tubes terminate in an orifice 51 of small section surrounded by a ring portion which enables it to withstand a certain pressure without expanding. In order to prevent rotation of the packing and thus to avoid the displacement of the tubes 49 with respect to the holes 50, the ring 47 of the valve is provided with projecting ribs 52 which are engaged during assembly in slots 53 provided in the lower part of the groove 48. A filter 54 is provided to prevent emulsion of the oil by breaking up all the air bubbles.

The operation of this device is similar to that of the shock-absorber shown in Fig. 1, with the exception that the packing-valve 45 acts in this case by retarding the passage of oil towards the reservoir when the piston rises, and providing on the contrary free passage for the return of the oil when the piston moves downwards.

It will, however, be noted that the orifices 51 are slightly smaller than those of the piston packing and the elasticity of the ring portions which surround them is more resistant, since the oil from the chamber 55 must pass through the piston by traversing the orifices 21 of the packing 15 before reaching the oil reservoir. If this precaution were not taken, cavitation would be produced in the chamber 56 during the compression of the suspension spring and the shock-absorber would lose its effectiveness on the rebound of the spring.

Figure 10:
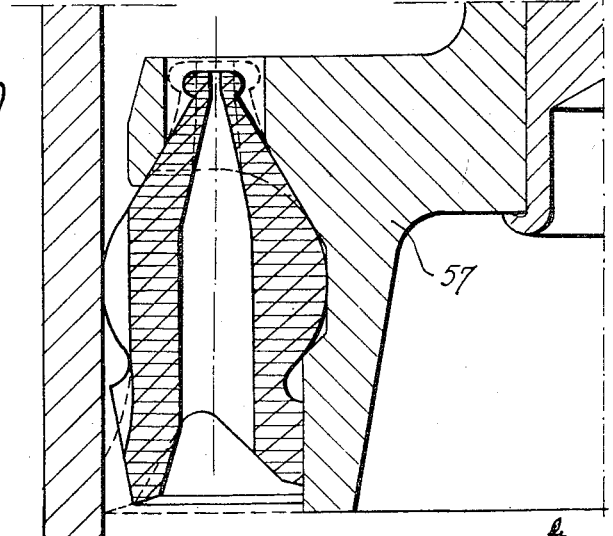
Fig. 10 is a vertical half-cross-section of a packing for the bottom of the cylinder, forming an alternative to that shown in Fig. 6.

As an alternative in the shock-absorber of Fig. 2, instead of using the packing 45 it is possible to use a packing which is similar in all respects to the packings 15 and 16 mounted on the piston, this analogy being again present in the construction of its seating 57 (see Fig. 10).

The construction of Fig. 10 contemplates the arrangement of shock absorbers wherein the cylinder does not have a valve packing 45 at its upper part with a seat which forms a partition and defines the oil tank and instead such a valve packing 45 is replaced by packings 15 and 16 similar to packings 15 and 16 shown in piston 9, and assuring the tightness of the latter in the cylinder due to their lips 17—18. It goes without saying that if packings 15 and 16 are provided to assure the tightness of the cylinder, it is not possible to retain the flat seat 46 on which the valve packing 45 assures tighness, but this flat seat 46 must be replaced by a seat 47 adapted to receive the packing 15 and 16.

The qualities of the two types of shock-absorber described follow from their design, but also from the very special properties of the packings with which they are provided, and which will be described below.

The packings 15 and 16 of the piston shown to a large scale in Figs. 3 to 5 produce a perfect fluid-tightness in the cylinder by means of their lips 17—18 to which the circular grooves 58 and 59 give a special flexibility by virtue of the body 60 mounted in tension in the housing 22 of the piston in which it is firmly retained as well as at the periphery 61 of the body forming the supporting and guiding surface for the packing and thus protecting the lips against any transverse reaction which could damage them.

The notches 33, which permit the passage of the oil round the packing in the direction which causes the lip 17 to lift upwards, do not limit in any way the bearing function carried out by the external portion of the packing body.

The packing-valve 45 shown to a large scale in Figs. 6, 7 and 8 provides fluid-tightness on a flat seating 46 and only effectively permits of a return flow to the reservoir by the orifices 51, and allows for a direction of flow of oil in the opposite sense, a free passage by virtue of the lifting of its peripheral portion which makes possible the thin circular portion 62 forming a hinge.

In the direction of free passage of the oil, this packing takes up the position 63 shown in fine lines in Fig. 6. This figure again shows in cross-section a tubular member and its orifice 51 which can be enlarged under high pressure, as shown by the outline 64 in chain-dotted lines.

Figure 9:
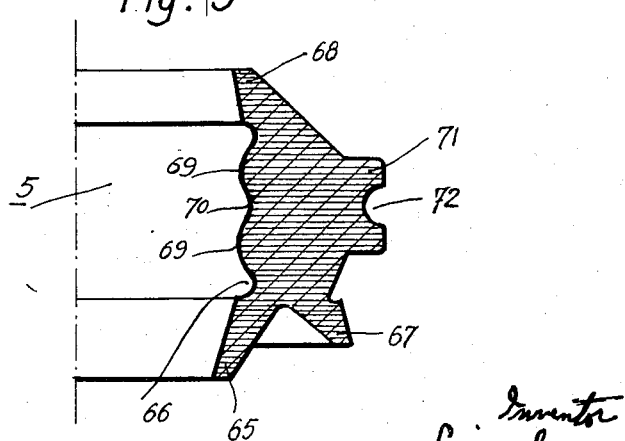
Fig. 9 is an enlarged radial cross-section of the packing of the stuffing gland.

The packing gland 5 shown to a larger scale in Fig. 9 has been specially designed so as to provide an absolute fluid-tightness under high pressure, an effective protection of the lips against any transverse reaction by virtue of a double sliding ring forming a bearing surface, and a very stable fixation which does not produce any deformation of the packing.

There is shown at 65 the main sliding lip of large section, which however is always articulated about a hinge formed by the circular hollowed portion 66, the lip 67 ensuring static fluid-tightness in the interior of the packing gland. A scraper and protective lip 68 and mainly the supporting surfaces 69 of the rod facilitate the sliding action by means of the groove 70 which separates them, the latter preventing any deformation of the lips, which thus retain their flexibility.

In the fixing flange 71 has been formed a circular groove 72, the object of which is to prevent swelling of the packing body when clamped, which would have the effect of locking the annular projections 69 of the rod. The deformation of the flange, if such were produced, would be taken up by the hollow portion of the groove.

Like the packings 15 and 16, this packing is mounted in tension. To this end, the lips of these packings have been vulcanised to a diameter such that after assembly, they are subjected to a tension which applies them against the wall with which they co-operate. In the case of these packings with two lips, the static packing is preferably given a camber such that it applies a return action on the rubbing packing which remains flexible and effective.

Packings 15 and 16 with different characteristics can of course be provided in order to combine with the effect of flexibility which they give, a different damping effect, such that the compression of the suspension spring is, for example, relatively less damped than its return motion.

It has been shown that the tubular members 20 with calibrated orifices are able to increase under a higher pressure by virtue of elasticity of the material of which the tube is made. It should be observed that the orifices could be arranged in any other manner such, for example, that the enlargement of the passage is obtained not by an expansion of the plastic or rubber material, but by a compression. This form of construction may have certain advantages, and especially in this respect that an elastic block stands up better, lasts longer and is less subject to deformation when it works in compression rather than in expansion.

The present form of construction of a straight shock-absorber has, of course, mainly been described by way of indication, and many alternative forms may be envisaged which fall within the scope of the invention or which again, while remaining within this scope, utilise the features of the invention in the construction of hydraulic piston-type of shock-absorbers in general, such as for example those in which the piston is actuated by an oscillating arm or a crank.

I claim:

1. A shock-absorber device for a vehicle suspension system, comprising a cylinder having a working fluid therein and a piston operatively mounted in said cylinder and dividing the cylinder into two chambers; two packing glands of elastic material mounted on the periphery of said piston, each of said glands opening into one of the chambers of said cylinder; a plurality of frusto-conical tubular members formed integrally with each of said packing glands and facing oppositely to the corresponding tubular members of the other of said glands, one extremity of each tubular member being formed as an extensible orifice through which said working fluid passes from one chamber of said cylinder to the other; flexible extensions forming lips on each of said glands in contact respectively with said piston and said cylinder walls and adapted to give fluid-tightness under compression; at least one first fluid-passage provided in the piston body between said glands; and at least one second fluid-passage provided at the line of contact of the glands with the cylinder wall, so as to permit said working fluid to pass from the chamber in compression to the other chamber by lifting one of the fluid-tightness lips of the said other chamber.

2. A shock-absorber device as claimed in claim 1, and further comprising: means for coupling said piston to the chassis and for coupling said cylinder to the wheel of said vehicle; a hollow piston-rod; conduit means leading said first fluid-passages into the space comprised within said piston-rod; said space serving as a fluid-reservoir for the said device.

3. A shock-absorber device as claimed in claim 1, and further comprising: means for coupling said piston to the chassis and for coupling said cylinder to the wheel of said vehicle; a hollow piston-rod; conduit means leading said first fluid-passages into the space comprised within said piston-rod; a fluid reservoir for said device; and further conduit means for coupling said piston-rod space to said fluid-reservoir.

4. A shock-absorber device as claimed in claim 1, and further comprising: means for coupling said cylinder to the chassis and said piston to the wheel of said vehicle; a solid piston-rod; a fixed transverse wall in the upper part of said cylinder, said wall de-limiting a fluid-reservoir from the upper chamber of said cylinder; at least one valve formed in the said wall, the rate of flow of fluid through said valve into said reservoir being less than that passing through the packing gland in said piston from the upper chamber to the lower chamber, said valves providing a free passage for the fluid from said reservoir to said upper chamber.

5. A shock-absorber device as claimed in claim 4, and further comprising: a seating formed by said transverse wall, said valves being formed in an elastic ring-shaped member having a flat upper face adapted to co-operate with said seating; a peripheral annular portion forming a part of said elastic ring member and flexibly coupled to the central portion of said ring member by a thinner annular section serving as a hinge for said outer peripheral portion; a plurality of frusto-conical passages formed axially in said outer peripheral portion, said passages terminating in extensible orifices co-operating with corresponding passages formed in said transverse wall; a central annular groove formed in a central boss on said transverse wall and adapted to act as a central housing for said elastic ring member; and radial projections formed on the central portion of said ring member and adapted to engage in radial slots formed in said housing, in order to prevent rotation of said elastic ring member with respect to its seating.

6. A shock-absorber device as claimed in claim 1, and further comprising: a peripheral groove formed in said piston; a toric member of flexible material mounted under tension in said groove; towards the chamber whose delivery is controlled by said piston, two fluid-tightness lips formed as extensions of said toric member, said lips being mounted under tension and rendered flexible by peripheral thinned-down sections adjacent their attachment to said member, one lip serving as a static sealing joint with said piston and the other lip forming a fluid-tight moving joint with the inner wall of said cylinder; formed integrally with said toric member between the said lips, tubular frusto-conical members with their axes parallel to the axis of said piston and terminating on the side opposite to said lips in extensible calibrated orifices; annular reinforcing members of like elastic material formed around said orifices to control the extensibility of said orifices; and axial notches formed in the periphery of said toric member and in the adjacent outer lip, so as to permit the return flow of said working fluid produced by the delivery controlled by the opposite packing gland.

7. A shock-absorber device as claimed in claim 1, and further comprising: a packing gland provided in the end wall of said cylinder for the passage of said piston-rod, said gland including an elastic ring-shaped member having at least two semi-circular projections formed on its inner face to act as bearing surfaces for said piston-rod; extending said elastic ring-member on the inner side of said cylinder, two oppositely-facing annular lips mounted under tension, one lip providing static fluid-tightness against the said gland, the other providing a moving fluid-tight joint with said piston-rod; extending said ring-member two further oppositely-facing annular lips, one serving as a scraper lip and the other as a protective lip; a peripheral central projection formed in said ring-member for fixing in said gland; and an annular groove of circular section formed in said projection, so as to prevent excessive friction of said ring-member on the piston-rod when the gland is tightened-up.

References Cited in the file of this patent

UNITED STATES PATENTS

| | | |
|---|---|---|
| 2,225,986 | Glezen | Dec. 24, 1940 |
| 2,579,058 | Trimble et al. | Dec. 18, 1951 |
| 2,646,859 | Read et al. | July 28, 1953 |
| 2,815,100 | Carbon | Dec. 3, 1957 |

FOREIGN PATENTS

| | | |
|---|---|---|
| 1,112,598 | France | Nov. 16, 1955 |
| 888,488 | Germany | Sept. 3, 1953 |